(12) United States Patent
Molahalli et al.

(10) Patent No.: US 11,875,233 B2
(45) Date of Patent: Jan. 16, 2024

(54) AUTOMATIC RECOGNITION OF ENTITIES RELATED TO CLOUD INCIDENTS

(71) Applicant: Microsoft Technology Licensing, LLC, Redmond, WA (US)

(72) Inventors: Manish Shetty Molahalli, Bangalore (IN); Chetan Bansal, Seattle, WA (US); Sumit Kumar, Bellevue, WA (US); Nikitha Rao, Bangalore (IN); Nachiappan Nagappan, Bellevue, WA (US); Thomas Michael Josef Zimmermann, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 859 days.

(21) Appl. No.: 16/925,453

(22) Filed: Jul. 10, 2020

(65) Prior Publication Data

US 2022/0012633 A1   Jan. 13, 2022

(51) Int. Cl.
*G06N 20/00* (2019.01)
*G06F 40/284* (2020.01)
*H04L 41/50* (2022.01)
*G06F 18/214* (2023.01)

(52) U.S. Cl.
CPC ......... *G06N 20/00* (2019.01); *G06F 18/2155* (2023.01); *G06F 40/284* (2020.01); *H04L 41/50* (2013.01)

(58) Field of Classification Search
CPC ...................................................... G06N 20/00
See application file for complete search history.

(56) References Cited

U.S. PATENT DOCUMENTS

| 2015/0019204 | A1 | 1/2015 | Simard et al. |
| 2019/0355270 | A1* | 11/2019 | McCann ................. G06F 40/30 |
| 2021/0048809 | A1* | 2/2021 | Zhang .................... G06N 3/088 |
| 2021/0149993 | A1* | 5/2021 | Torres ................... G06F 40/295 |

OTHER PUBLICATIONS

Singla, Karan, and Shrikanth Narayanan. "Multitask Learning for Darpa Lorelei's Situation Frame Extraction Task." ICASSP 2020-2020 IEEE International Conference on Acoustics, Speech and Signal Processing (ICASSP). IEEE, 2020. (Year: 2020).*

(Continued)

*Primary Examiner* — Eric Nilsson
(74) *Attorney, Agent, or Firm* — Ranjeev Singh; Singh Law, PLLC

(57) ABSTRACT

Systems and methods for automatic recognition of entities related to cloud incidents are described. A method, implemented by at least one processor, for processing cloud incidents related information, including entity names and entity values associated with incidents having a potential to adversely impact products or services offered by a cloud service provider is provided. The method may include using at least one processor, processing the cloud incidents related information to convert at least words and symbols corresponding to a cloud incident into machine learning formatted data. The method may further include using a machine learning pipeline, processing at least a subset of the machine learning formatted data to recognize entity names and entity values associated with the cloud incident.

20 Claims, 11 Drawing Sheets

(56) References Cited

OTHER PUBLICATIONS

Wang, Xuan, et al. "Cross-type Biomedical Named Entity Recognition with Deep Multi-Task Learning." (2018). (Year: 2018).*
Alammar, Jay, "The Illustrated Transformer", Retrieved from: https://jalammar.github.io/illustrated-transformer/, Jun. 27, 2018, 33 Pages.
Ghojogh, et al., "Attention Mechanism, Transformers, BERT, and GPT: Tutorial and Survey", Retrieved from: https://osf.io/m6gcn/download, Dec. 17, 2020, 14 Pages.
Horev, Rani, "BERT Explained: State of the Art Language Model for NLP", In Publication of Towards Data Science, Nov. 10, 2018, 11 Pages.
"International Search Report and Written Opinion Issued in PCT Application No. PCT/US21/032130", dated Sep. 1, 2021, 11 Pages.
Sharma, Nikita, "How to Build Deep Neural Network for Custom NER with Keras", Retrieved From: https://confusedcoders.com/data-science/deep-learning/how-to-build-deep-neural-network-for-custom-ner-with-keras, Dec. 29, 2019, 11 Pages.
Singla, et al., "Multitask Learning for Darpa Lorelei's Situation Frame Extraction Task", In Proceedings of International Conference on Acoustics, Speech and Signal Processing, May 4, 2020, pp. 8149-8153.
Wang, et al., "Multitask Learning for Biomedical Named Entity Recognition with Cross-Sharing Structure", In the Journal of BMC Bioinformatics, vol. 20, Issue 1, Aug. 16, 2019, 13 Pages.
Yang, et al., "Information Extraction from Electronic Medical Records Using Multitask Recurrent Neural Network with ContextualWord Embedding", In Journal of Applied Sciences, vol. 9, Issue 18, Sep. 4, 2019, 16 Pages.
"Gartner Forecasts Worldwide Public Cloud Revenue to Grow 17% in 2020", Retrieved From: https://www.gartner.com/en/newsroom/press-releases/2019-11-13-gartner-forecasts-worldwide-public-cloud-revenue-to-grow-17-percent-in-2020, Nov. 13, 2019, 3 Pages.
Anvik, et al., "Who Should Fix This Bug?", In Proceedings of the 28th International Conference on Software Engineering, May 20, 2006, pp. 361-370.
Ardimento, et al., "Knowledge Extraction from On-Line Open Source Bug Tracking Systems to Predict Bug-Fixing Time", In Proceedings of the 7th International Conference on Web Intelligence, Mining and Semantics, Jun. 19, 2017, 9 Pages.
Bahdanau, et al., "Neural Machine Translation by Jointly Learning to Align and Translate", In Repository of arXiv:1409.0473v1, Sep. 1, 2014, 15 Pages.
Bansal, et al., "DeCaf: Diagnosing and Triaging Performance Issues in Large-Scale Cloud Services", In Proceedings of the IEEE/ACM 42nd International Conference on Software Engineering: Software Engineering in Practice, May 23, 2020, 10 Pages.
Bettenburg, et al., "Extracting Structural Information from Bug Reports", In Proceedings of the International Working Conference on Mining Software Repositories, May 10, 2008, pp. 27-30.
Bortis, et al., "PorchLight: A Tag-Based Approach to Bug Triaging", In Proceedings of the 35th International Conference on Software Engineering, May 18, 2013, pp. 342-351.
Caruana, Rich, "Multitask Learning", In Journal of Machine Learning, vol. 28, Issue 1, Jul. 1, 1997, pp. 41-75.
Chen, et al., "An Empirical Investigation of Incident Triage for Online Service Systems", In Proceedings of the IEEE/ACM 41st International Conference on Software Engineering: Software Engineering in Practice, May 25, 2019, pp. 111-120.
Chen, et al., "Continuous Incident Triage for Large-Scale Online Service Systems", In Proceedings of the 34th IEEE/ACM International Conference on Automated Software Engineering, Nov. 11, 2019, pp. 364-375.
Chen, et al., "Outage Prediction and Diagnosis for Cloud Service Systems", In Proceedings of The World Wide Web Conference, May 13, 2019, pp. 2659-2665.
Chen, et al., "Recurrent Attention Network on Memory for Aspect Sentiment Analysis", In Proceedings of the Conference on Empirical Methods in Natural Language Processing, Sep. 7, 2017, pp. 452-461.
Chiu, et al., "Named Entity Recognition with Bidirectional LSTM-CNNs", In Transactions of the Association for Computational Linguistics, vol. 4, Jul. 2016, pp. 357-370.
Collobert, et al., "Natural Language Processing (Almost) from Scratch", In Journal of Machine Learning Research, Article 12, Aug. 2011, pp. 2493-2537.
Dang, et al., "AIOps: Real-World Challenges and Research Innovations", In Proceedings of the IEEE/ACM 41st International Conference on Software Engineering: Companion Proceedings, May 25, 2019, pp. 4-5.
Devlin, et al., "BERT: Pre-Training of Deep Bidirectional Transformers for Language Understanding", In Repository of arXiv:1810.04805v1, Oct. 11, 2018, 14 Pages.
Eule, Alexander, "Autodesk's Bet on the Cloud Will Generate Big Returns for Shareholders", Retrieved From: https://www.barrons.com/amp/articles/autodesks-bet-on-the-cloud-will-generate-big-returns-for-shareholders-1443248123, Sep. 26, 2015, 6 Pages.
Florian, et al., "Named Entity Recognition Through Classifier Combination", In Proceedings of the 7th Conference on Natural Language Learning at HLT-NAACL, vol. 4, May 31, 2003, 4 Pages.
Graves, et al., "Framewise Phoneme Classification with Bidirectional LSTM and Other Neural Network Architectures", In Journal of Neural Networks, vol. 18, Issue 5-6, Jul. 1, 2005, 8 Pages.
Hochreiter, et al., "Long Short-Term Memory", In Journal of Neural Computation, vol. 9, Issue 8, Nov. 15, 1997, pp. 1735-1780.
Huang, et al., "Bidirectional LSTM-CRF Models for Sequence Tagging", In Repository of arXiv:1508.01991v1, Aug. 9, 2015, 10 Pages.
Kumar, et al., "Building Sankie: An AI Platform for DevOps", In Proceedings of the IEEE/ACM 1st International Workshop on Bots in Software Engineering, May 28, 2019, pp. 48-53.
Lafferty, et al., "Conditional Random Fields: Probabilistic Models for Segmenting and Labeling Sequence Data", In Proceedings of the 18th International Conference on Machine Learning, Jun. 28, 2001, 8 Pages.
Lample, et al., "Neural Architectures for Named Entity Recognition", In Repository of arXiv:1603.01360v1, Mar. 4, 2016, 10 Pages.
Li, et al., "Discourse Parsing with Attention-Based Hierarchical Neural Networks", In Proceedings of the Conference on Empirical Methods in Natural Language Processing, Nov. 1, 2016, pp. 362-371.
Li, et al., "Predicting Node Failures in an Ultra-Large-Scale Cloud Computing Platform: An AIOps Solution", In ACM Transactions on Software Engineering and Methodology, vol. 29, Issue 2, Apr. 2020, 24 Pages.
Luo, et al., "Correlating Events with Time Series for Incident Diagnosis", In Proceedings of the 20th ACM SIGKDD International Conference on Knowledge Discovery and Data Mining, Aug. 24, 2014, pp. 1583-1592.
McCallum, et al., "Early Results for Named Entity Recognition with Conditional Random Fields, Feature Induction and Web-Enhanced Lexicons", In Proceedings of the 7th Conference on Natural Language Learning at HLT-NAACL, vol. 4, May 31, 2003, 4 Pages.
Mehta, et al., "Rex: Preventing Bugs and Misconfiguration in Large Services Using Correlated Change Analysis", In Proceedings of the 17th USENIX Symposium on Networked Systems Design and Implementation, Feb. 25, 2020, pp. 435-448.
Mikolov, et al., "Recurrent Neural Network Based Language Model", In Proceedings of 11th Annual Conference of the International Speech Communication Association, Sep. 26, 2010, pp. 1045-1048.
Misra, et al., "Cross-Stitch Networks for Multi-Task Learning", In Proceedings of the IEEE Conference on Computer Vision and Pattern Recognition, Jun. 27, 2016, pp. 3994-4003.
Nadeau, et al., "A Survey of Named Entity Recognition and Classification", In Journal of Lingvisticae Investigationes, vol. 30, Issue 1, Jan. 1, 2007, 20 Pages.
Nair, et al., "Learning a Hierarchical Monitoring System for Detecting and Diagnosing Service Issues", In Proceedings of the 21th ACM SIGKDD International Conference on Knowledge Discovery and Data Mining, Aug. 11, 2015, 10 Pages.
Nichols, Shaun, "Good Guy, Microsoft: Multi-Factor Auth Outage Gives Cloudy Office, Azure Users a Surprise Three-Day Weekend",

(56) References Cited

OTHER PUBLICATIONS

Retrieved From: https://www.theregister.com/2019/10/18/microsoft_azure_mfa/, Oct. 18, 2019, 4 Pages.

Pantel, et al., "Mining Entity Types from Query Logs via User Intent Modeling", In Proceedings of the 50th Annual Meeting of the Association for Computational Linguistics, vol. 1, Jul. 8, 2012, pp. 563-571.

Pasca, Marius, "Weakly-Supervised Discovery of Named Entities Using Web Search Queries", In Proceedings of the 16th ACM Conference on Information and Knowledge Management, Nov. 6, 2007, pp. 683-690.

Paul, Ian, "Microsoft Says its Boxed Software Probably will be Gone within a Decade", Retrieved From: https://web.archive.org/web/20160321181425/https://www.pcworld.com/article/2038194/microsoft-says-its-boxed-software-probably-will-be-gone-within-a-decade.html, May 8, 2013, 4 Pages.

Paulus, et al., "A Deep Reinforced Model for Abstractive Summarization", In Repository of arxiv:1705.04304v1, May 11, 2017, 10 Pages.

Pennington, et al., "GloVe: Global Vectors for Word Representation", In Proceedings of the Conference on Empirical Methods in Natural Language Processing, Oct. 25, 2014, pp. 1532-1543.

Ruder, et al., "Sluice Networks: Learning what to Share Between Loosely Related Tasks", In Repository of arXiv:1705.08142v1, May 23, 2017, 10 Pages.

Stevens, Laura, "Amazon Finds the Cause of Its AWS Outage: A Typo", Published in The Wall Street Journal, Mar. 3, 2017, 1 Page.

Tian, et al., "Learning to Rank for Bug Report Assignee Recommendation", In Proceedings of the IEEE 24th International Conference on Program Comprehension, May 16, 2016, 10 Pages.

Vaswani, et al., "Attention is All You Need", In Proceedings of the 31st Conference on Neural Information Processing Systems, Dec. 4, 2017, 11 Pages.

Vyas, et al., "Semi-Automatic Entity Set Refinement", In Proceedings of Human Language Technologies: The Annual Conference of the North American Chapter of the Association for Computational Linguistics, Jun. 2009, pp. 290-298.

Wang, et al., "FixerCache: Unsupervised Caching active Developers for Diverse Bug Triage", In Proceedings of the 8th ACM/IEEE International Symposium on Empirical Software Engineering and Measurement, Sep. 18, 2014, 10 Pages.

Xu, et al., "Entity-Based Query Reformulation Using Wikipedia", In Proceedings of the 17th ACM Conference on Information and Knowledge Management, Oct. 26, 2008, pp. 1441-1442.

Zhou, et al., "Combining Text Mining and Data Mining for Bug Report Classification", In Journal of Software: Evolution and Process, vol. 28, Issue 3, Feb. 23, 2016, pp. 150-176.

Yang, Irene, "Keywords Extraction with Ngram and Modified Skip-gram Based on Spacy", Retrieved From: https://web.archive.org/web/20191130080503/https://medium.com/reputation-com-datascience-blog/keywords-extraction-with-ngram-and-modified-skip-gram-based-on-spacy-14e5625fce23, Mar. 18, 2019, 9 pages.

"AIOps from IBM", Retrieved From: https://www.ibm.com/watson/aiops, Retrieved on Jul. 6, 2020, 2 Pages.

"AIOps: Artificial Intelligence for IT Operations", Retrieved From: https://web.archive.org/web/20200507190746/https://www.splunk.com/en_us/artificial-intelligence-aiops.html, May 7, 2020, 15 Pages.

"Artificial Intelligence for IT operations (AIOps)", Retrieved From: https://web.archive.org/web/20200616080732/https://aws.amazon.com/marketplace/solutions/devops/ai-ops/, Jun. 16, 2020, 4 Pages.

"Cloud Developer Tools", Retrieved From: https://web.archive.org/web/20200503142148/https://cloud.google.com/products/tools, May 3, 2020, 8 Pages.

* cited by examiner

| DETAILS | DIAGNOSTICS | NOTIFICATIONS | POSTMORTEM | ACTIVITY LOG (HISTORY) | SIMILAR INCIDENTS (26) |
|---|---|---|---|---|---|

Incident Summary

General Details

1. Subscription ID: 4536dc56 – e2e1 – 3465 – a22b – d25f62456233
2. ASC link with details: https://supportcenter.cloudx.com/caseoverview?srid=1123

Problem Information:
Issue : VM in failed state, unable to delete VM or perform any activity VM : /subscriptions/4536dcd6-e2e1-3465-a22b-d25f62456233/resourceGroups/TL/provid/Coimpany.Compute/virtualMachinez/AppITLSServer Resource Group :TL
Cluster :northcentral-23

FIG. 7

| DETAILS | DIAGNOSTICS | NOTIFICATIONS | POSTMORTEM | ACTIVITY LOG (HISTORY) | SIMILAR INCIDENTS (13) |
|---|---|---|---|---|---|

Incident Summary

Description of the issue:

The customer is unable to delete a Vnet because of the service link to an old App Service. They have already deleted the App Service:/subscriptions/ 4536dcd6-e2e1-3465-a22b-d25f62456123/resourceGroups/mda/providers/ company.Network/virtualNest/wa-vnet We also tried deleting the Subnet 'CloudServices' but that resulted in the error "Failed to delete subnet 'CloudServices'.

Error: Subnet CloudServices is in use by wa-vnet/Services/Link and cannot be deleted. In order to delete the subnet, delete all the resources within the subnet.

FIG. 8

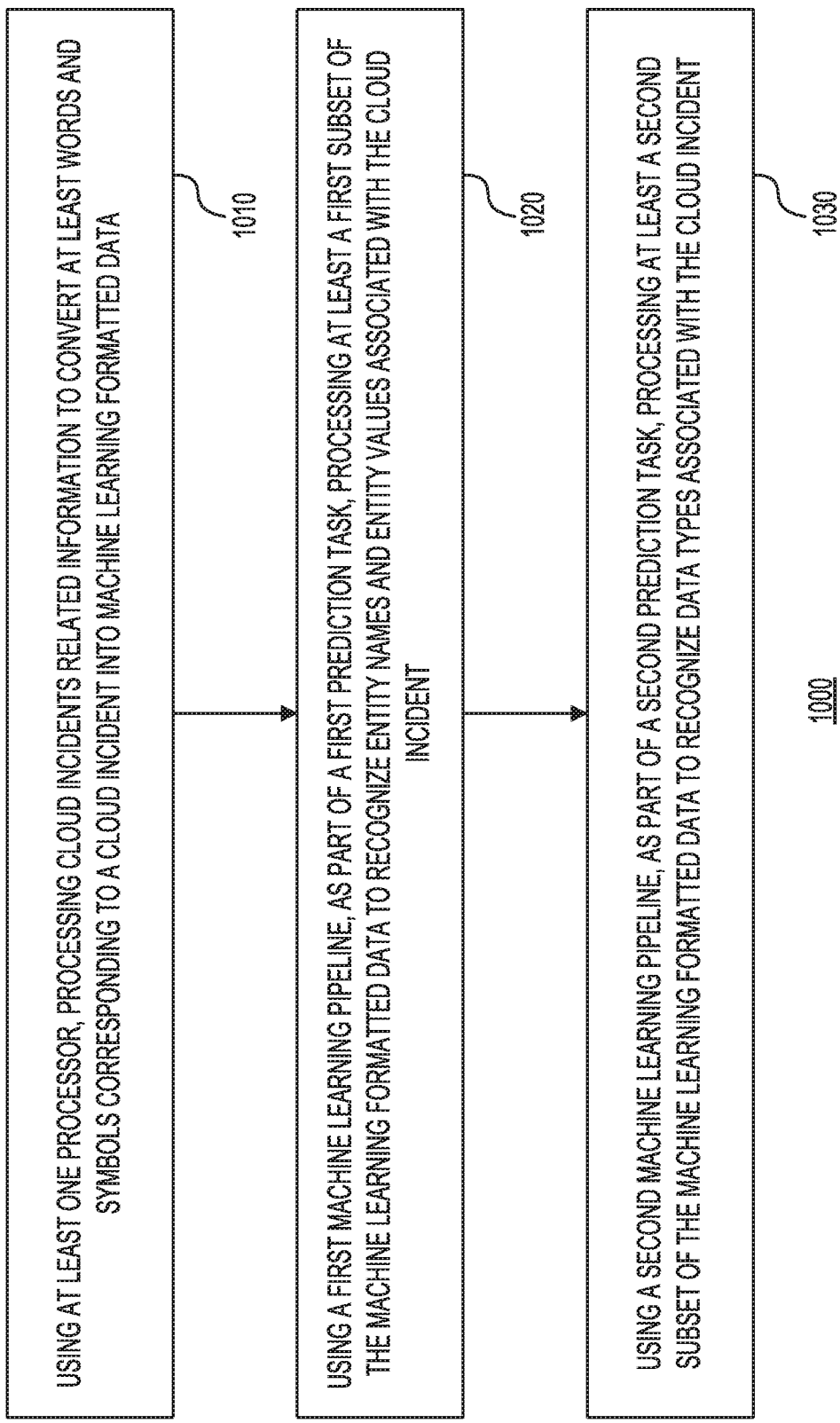

AUTOMATIC RECOGNITION OF ENTITIES RELATED TO CLOUD INCIDENTS

BACKGROUND

The public cloud includes a global network of servers that perform a variety of functions, including storing and managing data, running applications, and delivering content or services, such as streaming videos, provisioning electronic mail, providing office productivity software, or handling social media. The servers and other components may be located in data centers across the world. While the public cloud offers services to the public over the Internet, businesses may use private clouds or hybrid clouds. Both private and hybrid clouds also include a network of servers housed in data centers.

Managing cloud incidents is difficult because of the large size of the unstructured information related to cloud incidents.

SUMMARY

In one example, the present disclosure relates to a method, implemented by at least one processor, for processing cloud incidents related information, including entity names and entity values associated with incidents having a potential to adversely impact products or services offered by a cloud service provider. The method may include using the at least one processor, processing the cloud incidents related information to convert at least words and symbols corresponding to a cloud incident into machine learning formatted data. The method may further include using a machine learning pipeline, processing at least a subset of the machine learning formatted data to recognize entity names and entity values associated with the cloud incident.

In another example, the present disclosure relates to a system, including at least one processor, for processing cloud incidents related information, including entity names and entity values associated with incidents having a potential to adversely impact products or services offered by a cloud service provider. The system may be configured to using the at least one processor, process the cloud incidents related information to convert at least words and symbols corresponding to a cloud incident into machine learning formatted data. The system may further be configured to using a machine learning pipeline, process at least a subset of the machine learning formatted data to recognize entity names and entity values associated with the cloud incident.

In yet another example, the present disclosure relates to a method, implemented by at least one processor, for processing cloud incidents related information, including entity names, entity values, and data types associated with incidents having a potential to adversely impact products or services offered by a cloud service provider. The method may include using the at least one processor, processing the cloud incidents related information to convert at least words and symbols corresponding to a cloud incident into machine learning formatted data. The method may further include using a first machine learning pipeline, as part of a first prediction task, processing at least a subset of the machine learning formatted data to recognize entity names and entity values associated with the cloud incident. The method may further include using a second machine learning pipeline, as part of a second prediction task, processing at least a subset of the machine learning formatted data to recognize data types associated with the cloud incident.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements, Elements in the figures are illustrated for simplicity and clarity and have not necessarily been drawn to scale.

FIG. 7 shows a layout for an incident description in accordance with one example;

FIG. 8 shows another layout for an incident description in accordance with one example;

FIG. 10 shows a flow chart of another method for processing cloud incidents related information, including recognizing entity names, entity values, and data types in accordance with one example.

DETAILED DESCRIPTION

Figure 1:
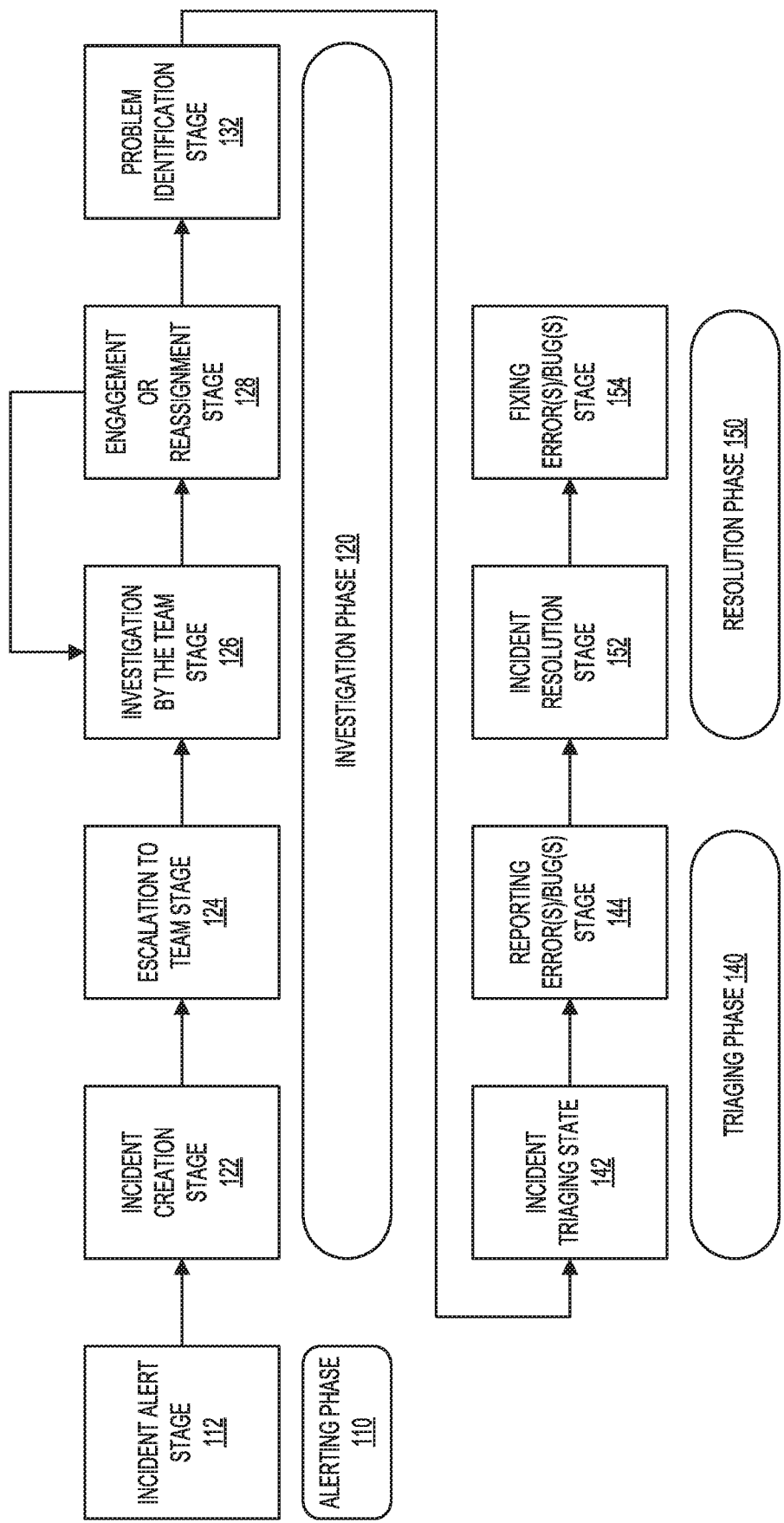
FIG. 1 is a block diagram of an incident lifecycle in accordance with one example.

Examples described in this disclosure relate to automatic recognition of entities related to cloud incidents. Certain examples relate to automatically recognizing entity names and data types related to cloud incidents using a machine learning pipeline. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Regardless of the arrangement of the cloud infrastructure, incidents requiring attention by the cloud service provider occur frequently.

Incident management includes activities such as automated triaging of incidents and incident diagnosis/detection. Structured knowledge extraction from incidents may require the use of machine learning. Machine learning may be used to extract information from sources, such as sources accessible via uniform resource links (e.g., web pages). In software artifacts like incidents, the vocabulary is not limited to the English language or other human languages. As an example, incidents' related information contains not just textual information concerning the incidents, but also information concerning entities such as GUIDs, Exceptions, IP Addresses, etc. Certain examples described in the present disclosure leverage a multi-task deep learning model for unsupervised knowledge extraction from information concerning incidents, such as cloud incidents. Advantageously, the unsupervised learning may eliminate the inefficiency of annotating a large amount of training data.

In certain examples, a framework for unsupervised knowledge extraction from service incidents is described. As part of certain examples, the knowledge extraction problem is framed as a named-entity recognition task for extracting factual information related to the cloud incidents. Certain examples related to the present disclosure leverage structural patterns like key, value pairs and tables for bootstrapping the training data. Other examples relate to using a multi-task learning based Bi-LSTM-CRF model, which leverages not only the semantic context associated with the incident descriptions, but also the data-types associated with the extracted named entities. Experiments with this unsupervised machine learning based approach show good results with a high precision of 0.96. In addition, because the described systems and methods in the present disclosure are domain agnostic, they can be applied to other types of services and teams. Moreover, these systems and methods can be extended to other artifacts, including support tickets and logs. Using the knowledge extracted by the example approaches described herein, significantly more accurate models for downstream tasks like incident triaging can also be built.

FIG. 1 is a block diagram of an incident lifecycle 100 in accordance with one example. In this example, incident lifecycle 100 may broadly be classified into four phases: alerting phase 110, investigation phase 120, triaging phase 140, and resolution phase 150. In alerting phase 110, during an incident alert stage 112, an incident may be triggered when the service monitoring metrics fall below a predefined level in terms of the performance (e.g., slow response to a query), a slow transfer rate, a customer complaint or escalation, a system hang or crash, or the like. In general, telemetry systems deployed for monitoring services being offered via the cloud platform may collect telemetry data via various sensors. The monitoring of such sensor data may trigger an incident as part of incident alert stage 112. Once an incident alert is generated, as part of investigation phase 120, the information related to the incident alert may be stored in an incident database as part of incident creation stage 122. Investigation phase 120 may further include an escalation to team stage 124, during which the incident may then be escalated to a relevant team. In one example, the identification of the relevant team may be automatic (e.g., based on heuristics or component ownership). Investigation phase 120 may further include an investigation by the team stage 126. As part of this stage, the relevant team may investigate the incident(s), and as part of engagement or reassignment stage 128, may engage with the relevant stakeholders or re-route the incident(s) to the appropriate team. As part of investigation phase 120, in problem identification stage 132, the cause(s) of the problem(s) that resulted in the incident alert(s) may be identified.

With continued reference to FIG. 1, once the appropriate team identifies the cause(s) of the problem(s) that resulted in the incident alert(s), the processing may move to triaging phase 140. In this phase, the incident(s) may be triaged according to any prioritization scheme. Next, in reporting error(s)/bug(s) stage 144, the appropriate error(s)/bug(s) related to the incident may be reported to the engineering teams. Next, in resolution phase 150, the incident may be resolved as part of incident resolution stage 152. Finally, as part of resolution phase 150, during fixing error(s)/bug(s) stage 154, any error(s) and/or bug(s) may be fixed such that the incidents caused by such error(s) and/or bug(s) do not recur. Other activities including root cause analysis may be pursued in parallel to ensure that incidents do not repeat in the future. Although FIG. 1 shows a certain number of phases as part of lifecycle 100 that are arranged in a certain manner, lifecycle 100 may include additional or fewer phases. In addition, although FIG. 1 shows a certain arrangement of stages within each phase, the phases may include additional or fewer stages, which may be arranged differently.

Figure 2:
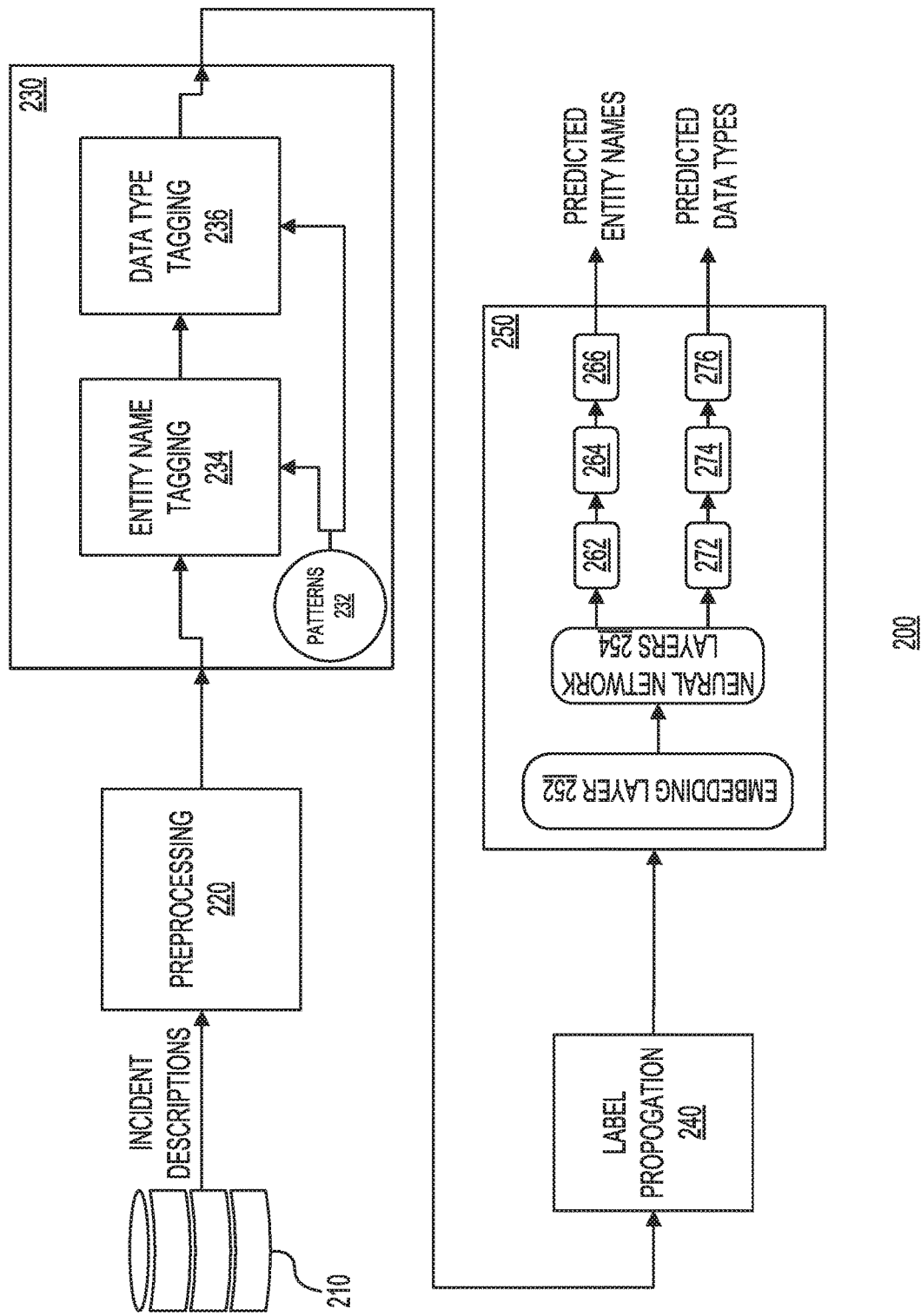
FIG. 2 shows a block diagram of a machine learning pipeline for automatically extracting entity names and data types related to cloud incidents.

FIG. 2 shows a block diagram of a machine learning pipeline 200 for automatically extracting entity names and data types related to cloud incidents. Machine learning pipeline 200 may include a storage 210, which may store incident descriptions. As explained earlier, the incident descriptions may include various unstructured pieces of information that may be generated as a result of incident alerts. Storage 210 may also be used to store incident logs, telemetry data, and support tickets.

With continued reference to FIG. 2, in this example, machine learning pipeline 200 may include several components, including preprocessing 220, unsupervised data labeling 230, label propagation 240, and multi-task learning 250. Machine learning pipeline 200 may be implemented using both offline training components and online prediction components. Offline training components may be responsible for training of the various machine language models, validating the models, and publishing the validated models.

Still referring to FIG. 2, preprocessing 220 may be configured to process the incident descriptions and incident summaries, including applying a data cleaning process. Service incident descriptions and summaries may be created by various sources such as external customers, feature engineers, or automated monitoring systems. The incidents related information could be in various forms, such as textual statements, conversations, stack traces, shell scripts, images, etc. While each of these types of unstructured information may be difficult to process, these descriptions contain useful information. In this example, preprocessing 220 may include several steps. As an example, first, the tables in the incident descriptions that have more than two columns may be pruned. In addition, the HTML tags may be removed using regexes and HTML parsers. As part of preprocessing 220, the incident descriptions and incidence summaries may be segmented into sentences using newline characters. Next, the individual sentences may be processed by cleaning up extra spaces and then they may be tokenized into words. The tokenization technique may be selected to handle even camel-case tokens (e.g., iPhone) and URLs as well.

Still referring to FIG. 2, unsupervised data labeling 230 may include identifying a set of entity names and then using the identified entity names as labels for tagging individual tokens in every incident description from a selected dataset. Identification of the set of entity names may include identifying patterns 232. Patterns 232 may include key value pairs (e.g., separated by a colon or a hyphen, such as key:value or key-value), tables, or any other data structure that can be used to represent relationships among keys, values, other such types of information. Patterns 232 may be extracted by identifying relationships in the incident descriptions. As an example, a key value pair in an incident description may be "Status code: 401." In this example, the text preceding the colon may be extracted as the entity name—Status code—and the text following the colon may be extracted as the entity value—401. In another example, another key value pair in an incident description may be "Problem type: VM not found." In this example, the text preceding the colon may be extracted as an entity name—Problem type—and the text following the colon may be extracted as the entity value—VM not found. Tables also occur quite frequently in the incident descriptions, especially the ones that are created by bots or by monitoring services. The text in the header tags '<th>' may be extracted as the entity name and the values in the corresponding rows may be extracted as entity values.

Entity names may correspond to various cloud services. Table 1 below shows an example of cloud services and related entity names.

TABLE 1

| Service Name | Related Entities |
|---|---|
| Visual Studio | { Subscription Id, Vault Id, Secret Name, Version, Thumbprint, Service ID, Run Message, } |
| Bing | { Account, Resource Type, Resource, Current State, Namespace, Metric, Monitor, } |
| Exchange | { Subscription Id, Forest, Forest Type, Location, Machine, Rack, Monitoring Tenants } |
| Teams | { Tenant Name, Problem Description, Web/Desktop/Mobile App, Affected User, Object Id, Tenant Id, Tenant Id, } |

The initial candidate set of entity names and values may be noisy since pattern extraction 232 includes extracting almost all of the text that matches certain patterns. In certain examples, entity names may correspond to the category names (e.g., instance, people, location, etc.). To reduce noise in the initial candidate set, any entity names that contain symbols or numbers may be filtered out. To generate a more robust set of named-entities, n-grams (n: 1 to 3) may be extracted from the entity names of the candidates by selecting the top 100, or another number depending on the size of the data and other factors, most frequently occurring n-grams. In this process, less frequently used entity names (likely noisy candidate entity names) such as "token acquisition starts," may be pruned. Also with the n-gram analysis, a candidate entity such as ["My Subscription ID is", "6572"] may be transformed to ["Subscription ID", "6572"] since "Subscription ID" is a commonly occurring bi-gram in the candidate set.

Next, as part of data type tagging 236, for the refined entity name candidate set, the data type of the entity values may be determined. As an example, along with regexes, certain Python functions such as "isnumeric" may be used. The use of the data types may help improve the accuracy for the individual prediction tasks. An example set of data types may include the following data types: (1) basic types (e.g., numeric, Boolean, alphabetical, alphanumeric, non-alphanumeric); (2) complex types (e.g., GUID, URI, IP address, URL); and (3) other types (e.g., any data types that do not fit neatly into the basic or the complex types of data types). In one example, to arrive at the most likely data type, the data type may be determined for each instance of a named entity. Then, conflicts may be resolved by taking the most frequent type. For instance, if "VM IP" entity is most commonly specified as an IP Address but sometimes is specified as a Boolean, due to noise or dummy values, the data type may be resolved to be an IP Address. Table 2 below shows additional examples of entity names, the corresponding data types, and an example of each entity name.

TABLE 2

| Entity Name | Data Type | Example |
|---|---|---|
| Problem Type | Alphabetical | VNet Failure |
| Exception Message | Alphabetical | The VPN gateway deployment operation failed due to an intermittent error |
| Failed Operation Name | Alphabetical | Create and Mount Volume |
| Resource Id | URI | /resource/2aa3abc0-7986-1abc-a98b-443fd7245e6f-resourcegroups/cs-net/providers/network/frontdoor/ |
| Tenant Id | GUID | 4536dcd6-e2e1-3465-a22b-d25f62456233 |
| Vnet Id | GUID | 45ea1234-123b-7969-adaf-e0255045569e |
| Link with Details | URL | https://supportcenter.cloudx.com/case overview?srid=112 |
| Device Name | Other | sab01-98cba-1d |
| Source IP | IP Address | 198.168.0.1 |
| Status Code | Number | 500 |
| Location | AlphaNumeric | eastus2 |

Once the set of entity names is finalized, the incident descriptions may be parsed and each token in the incident descriptions may be tagged. As part of entity name tagging 234, unsupervised machine learning algorithms may be used to tag the incident descriptions with entity names. An example of a tagged sentence, which may be part of an incident description, is shown in Table 3 below.

TABLE 3

| Sentence | "VNetId : 4536dcd6-e2e1-3465-a22b-d25f62456233 has operation issue : delete" |
|---|---|
| Tagged Sentence | [VNetId, <O>] [ :, <O>] [4536dcd6-e2e1-3465-a22b-d25f62456233, <V_NET_ID>] [ has, <O>] [ operation [ issue, <O>] [ :, <O>] [ delete, <ISSUE>] |

In Table 3, <O>, which may be viewed as <Other> or <Outside> refers to tokens that are not entities. The tagged sentences, such as the one shown in Table 3, may be used to create a labeled dataset that can be used to train the machine learning models used as part of multi-task learning 250.

Referring back to FIG. 2, machine learning pipeline 200 may further include label propagation 240. Unsupervised data labeling 230 allows bootstrapping of the training data using the pattern extraction. While this allows the generation of a seed dataset, the recall may suffer since the entities could occur inline within the incident descriptions without the key-value pair patterns or tabular patterns. The absence of any ground truth or any labeled data poses a problem. In one example, label propagation 240 may be used to solve this challenge. Label propagation 240 may use unsupervised machine learning techniques to label the incident descriptions, which may then be used to train a deep learning based model. In this example, to avoid over-fitting the model on the specific patterns, the labels may be diversified as part of this process.

In this example, the entity names and values extracted in the bootstrapping process and their types may be propagated to an entire corpus of incident descriptions. As an example, if the IP Address "127.0.0.1" was extracted as a "Source IP" entity, then all un-tagged occurrences of "127.0.0.1" in the corpus may be tagged as "Source IP." Certain corner cases may need to be handled differently. For instance, the aforementioned technique may not be usable for entities with the Boolean data type. As an example, an entity name may be "Is Customer Impacted" and the value may be "true" or "false." In this case, all occurrences of the word true or false cannot be labeled as corresponding to the entity "Is Customer Impacted." Label propagation 240 may also not work for all multi token entities, particularly the ones which are descriptive.

To the extent different occurrences of a particular value were tagged as different entities during bootstrapping, conflicts may be resolved using various techniques. As an example, an IP address (e.g., "127.0.0.1") can be "Source IP" in one incident while it may be "Destination IP" in another incident. In this example, during label propagation 240, such conflicts may be resolved based on popularity, (e.g., the value may be tagged with the entity name which occurs more frequently across the corpus). The frequency of occurrences may be tracked using histograms or other similar data structures.

Still referring to FIG. 2, machine learning pipeline 200 may further include multi-task learning 250. Multi-task learning 250 may automate the task of creating labeled data for deep learning models which can further generalize knowledge extraction. Multi-task learning may include an embedding layer 252. Incident descriptions may be converted to word level vectors using an embedding layer 252. As an example, an incident description may include words W1, W2, W3, and WN, which may be converted into vectors for further processing. Multi-task learning 250 may further include shared neural network layers 254 and task-specific layers. Multi-task learning 250 may solve two entity recognition tasks simultaneously—entity name recognition task ($l_1$) and data type recognition task ($l_7$). The entity name prediction is treated as the main task and data type prediction is treated as the auxiliary task. In this example, entity name recognition may include the use of shared neural network layers 254 and layers labeled as 262, 264, and 266. In addition, in this example, data type recognition may include the use of shared neural network layers 254 and layers labeled as 272, 274, and 276, In this example, layers 262 and 272 may comprise a time distributed dense layer 460 of FIG. 4B; layers 264 and 274 may comprise an attention layers 470 of FIG. 4B; and layers 266 and 276 may comprise a conditional random fields (CRF) layer 480 of FIG. 4B.

The losses may initially be calculated individually for both tasks, $l_1$ and $l_2$, and then combined into $loss_c$ using a weighted sum. The parameter $loss_{weights}=(\propto, \beta)$ may be used to control the importance between the main task and the auxiliary task as follows: $loss_c = \propto \times l_1 + \beta \times l_2$. During the training, multi-task learning 250 may aim to minimize the $loss_c$ but the individual losses are back-propagated to only those layers that produced the output. With such an approach, the lower level common layers are trained by both tasks, whereas the task specific layers are trained by individual losses. Additional details concerning various components of machine learning pipeline 200 are provided later with respect to FIGS. 4A and 4B, Although FIG. 2 shows certain components of machine learning pipeline 200 that are arranged in a certain manner, machine learning pipeline 200 may include additional or fewer components arranged differently. In addition, certain components of machine learning pipeline 200 may be used for training of the machine learning models and other components may be used for prediction tasks. Thus, machine learning pipeline 200 may include only one of these types of components or both of these types of components depending upon the functions being performed using such a pipeline.

Figure 3:
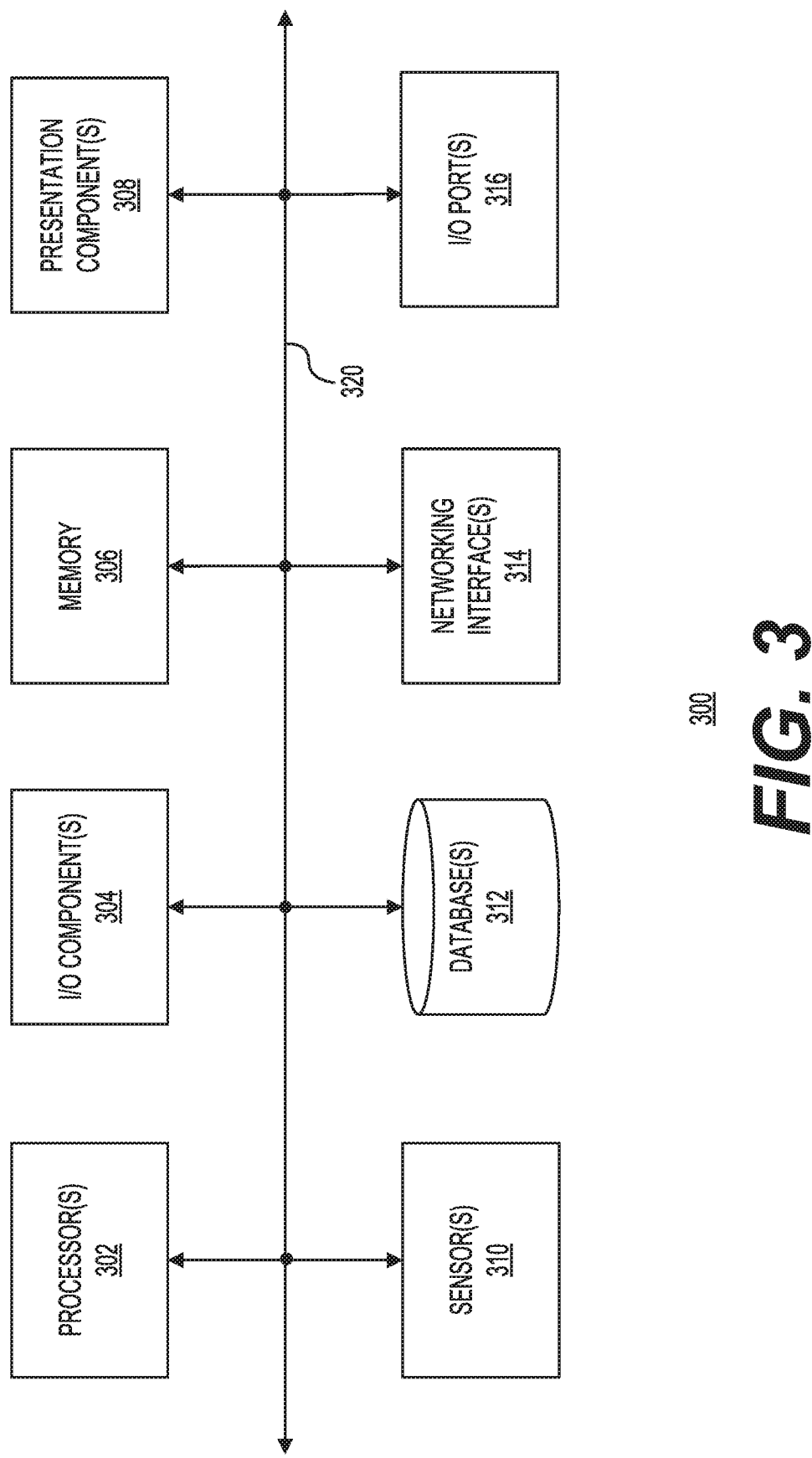
FIG. 3 is a block diagram of a system for performing methods associated with the present disclosure in accordance with one example.

FIG. 3 is a block diagram of a system 300 for performing methods associated with the present disclosure in accordance with one example. As an example, system 300 may be used to implement the various parts of machine learning pipeline 200 of FIG. 2. System 300 may include a processor(s) 302, I/O component(s) 304, memory 306, presentation component(s) 308, sensors 310, database(s) 312, networking interfaces 314, and I/O port(s) 316, which may be interconnected via bus 320. Processor(s) 302 may execute instructions stored in memory 306. Processor(s) 302 may include CPUs, GPUs, ASICs, FPGAs, or other types of logic configured to execute instructions. I/O component(s) 304 may include components such as a keyboard, a mouse, a voice recognition processor, or touch screens. Memory 306 may be any combination of non-volatile storage or volatile storage (e.g., flash memory, DRAM, SRAM, or other types of memories). Presentation component(s) 308 may include displays, holographic devices, or other presentation devices. Displays may be any type of display, such as LCD, LED, or other types of display. Sensor(s) 310 may include telemetry or other types of sensors configured to detect, and/or receive, information (e.g., conditions associated with the various devices in a data center). Sensor(s) 310 may include sensors configured to sense conditions associated with CPUs, memory or other storage components, FPGAs, motherboards, baseboard management controllers, or the like. Sensor(s) 310 may also include sensors configured to sense conditions associated with racks, chassis, fans, power supply units (PSUs), or the like. Sensor(s) 310 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

Still referring to FIG. 3, database(s) 312 may be used to store any of the data or files (e.g., incident descriptions or the like) as needed for the performance of methods described herein. Database(s) 312 may be implemented as a collection of distributed databases or as a single database. Network interface(s) 314 may include communication interfaces, such as Ethernet, cellular radio, Bluetooth radio, UWB radio, or other types of wireless or wired communication interfaces. I/O port(s) 316 may include Ethernet ports, Fiber-optic ports, wireless ports, or other communication ports.

Instructions corresponding to preprocessing 220, unsupervised data labeling 230, label propagation 240, and multi-task learning 250 and their respective constituent parts may be stored in memory 306 or another memory. These instructions when executed by processor(s) 302, or other processors, may provide the functionality associated with machine learning pipeline 200. The instructions corresponding to machine learning pipeline 200, and related components, could be encoded as hardware corresponding to an A/I processor. In this case, some or all of the functionality associated with the learning-based analyzer may be hard-coded or otherwise provided as part of an Ail processor. As an example, A/I processor may be implemented using a field programmable gate array (FPGA) with the requisite functionality. Other types of hardware such as ASICs and GPUs may also be used. The functionality associated with machine learning pipeline 200 may be implemented using any appropriate combination of hardware, software, or firmware. Although FIG. 3 shows system 300 as including a certain number of components arranged and coupled in a certain way, it may include fewer or additional components arranged and coupled differently. In addition, the functionality associated with system 300 may be distributed or combined, as needed.

Figure 4A:
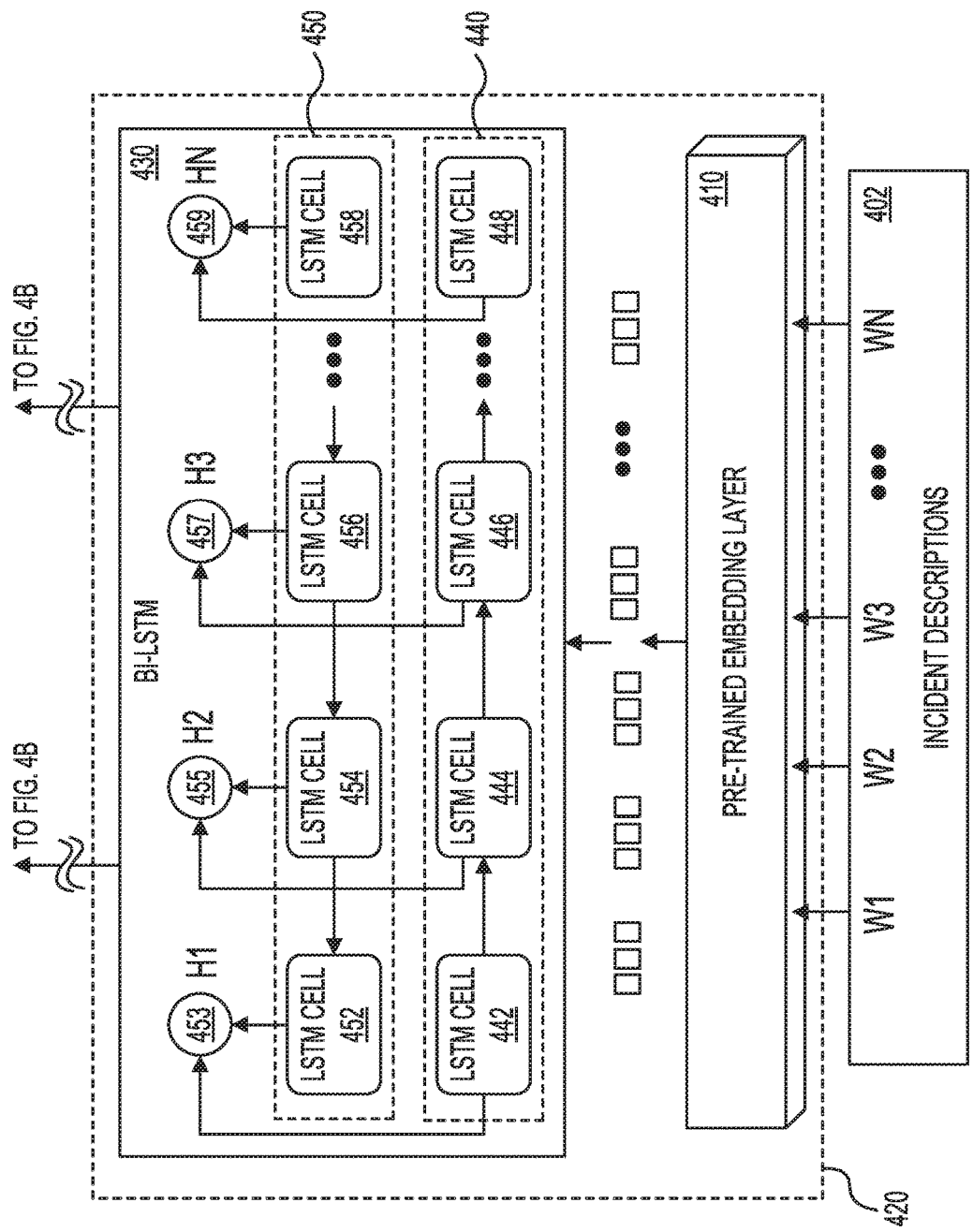
FIGS. 4A and 4B show a deep learning model with a multi-head architecture in accordance with one example.
Figure 4B:
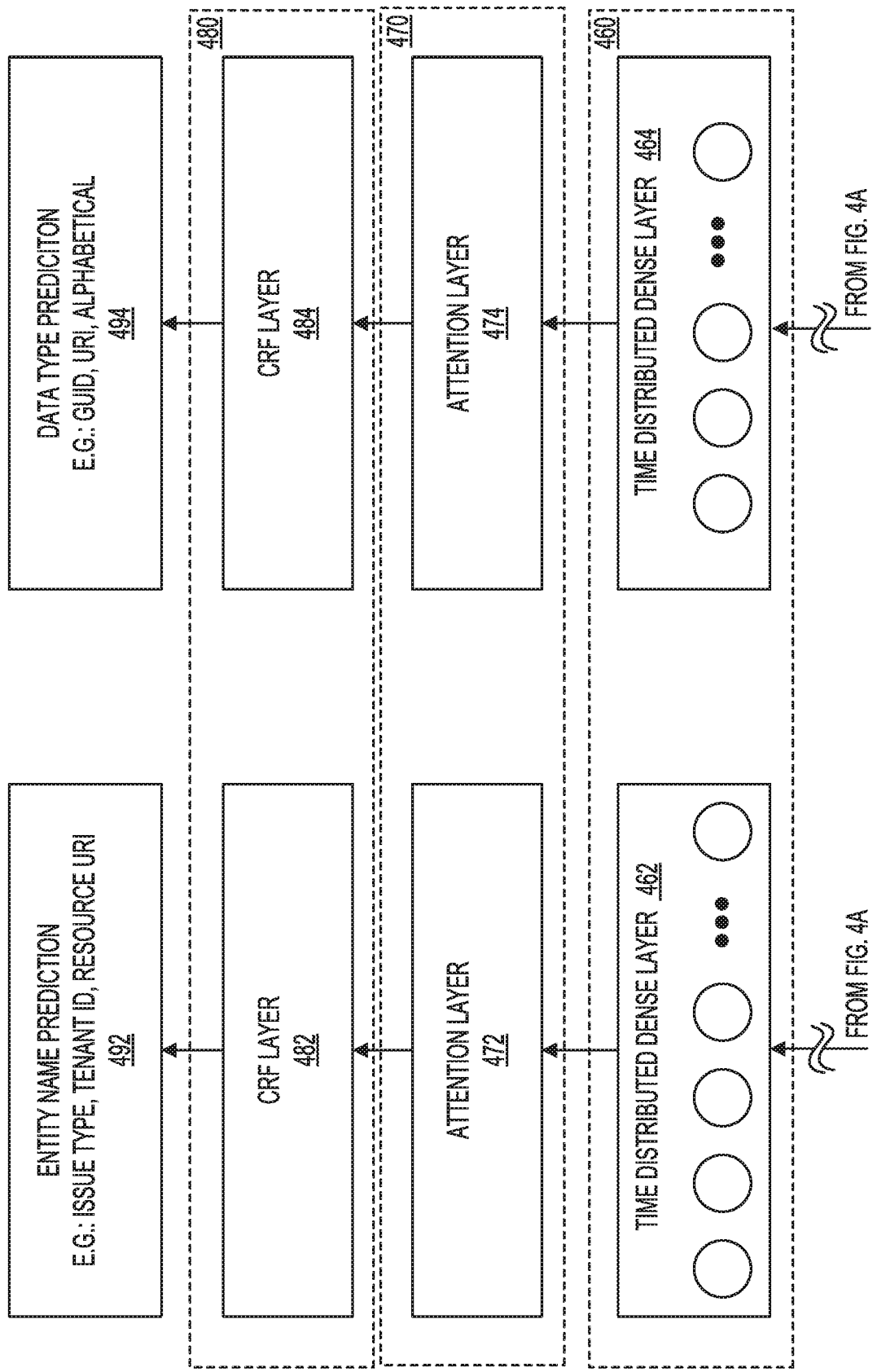

FIGS. 4A and 4B show a deep learning model 400 with a multi-head architecture in accordance with one example. In this example, deep learning model 400 may be used to implement certain aspects of multi-task learning 250 of FIG. 2. In this example, words and symbols extracted from an incident description may be first converted into a sequence of vectors. The sequence of vectors may be interpreted, both in a forward direction and in a reverse direction, by a Bi-directional Long Short-term Memory (LSTM) layer 430. The two prediction tasks may include entity name prediction and data type prediction. The two tasks may be handled in a way that some common parameters and layers (e.g., layers within the box 420 of FIG. 4) may be shared for both tasks, but there may also be task specific layers (e.g., separate time distributed dense layers 462 and 464, separate attention layers 472 and 474, and separate conditional random fields (CRF) layers 482 and 484). Although separate such layers are used, for ease of explanation, these layers are addressed using common reference numerals as shown in FIG. 4B: time distributed dense layer 460, attention layer 470, and CRF layer 480. Time distributed dense layer 460 may transpose the Bi-directional LSTM hidden vectors to the shape of the output labels. An attention mechanism (e.g., attention layer 470) may help the model bias the learning towards the more relevant sections of the sentences. In addition, in this example, a conditional random fields (CRF) layer 480 may produce a valid sequence of output labels. As shown in FIG. 4B, the output may include entity name prediction 492 and data type prediction 494. Back propagation using a combination of loss functions may be performed during training and the individual tag precision may be evaluated using recall and F1 metrics.

In certain examples, by using the underlying common information contained among related tasks multi-task learning may be used to improve generalization. In the context of classification or sequence labelling, the multi-task learning may improve the performance of individual tasks by learning them jointly. In certain examples described herein, named-entity recognition is the primary task. In this task, the machine learning models may primarily learn from context words that support occurrences of entities. Incorporating a complimentary task of predicting the data type of a token may reinforce intuitive constraints, resulting in better training of the machine learning models. For example, in an input like "The SourceIPAddress is 127.0.0.1," the token 127.0.0.1 is identified more accurately by the machine learning models described herein, as the entity name "Source IP Address" because it is also identified as the data-type "IP Address", in parallel. In sum, the machine learning models supplement the intuition that all Source IP Addresses are of the data type IP addresses; thus, improving the model performance. Accordingly, in these examples data type prediction is used as the auxiliary task for the deep learning models. Various types of architectures may allow multi-task learning, including but not limited to, multi-head architectures, cross-snitch networks, and sluice networks. Certain examples described herein use a multi-head architecture, where the lower level features generated by the two neural network layers are shared, whereas the other layers are task specific.

As noted previously, the entity name prediction is treated as the main task and data type prediction is treated as the auxiliary task. The losses are initially calculated individually for both tasks, $l_1$ and $l_2$, and then combined into $loss_c$ using a weighted sum. The parameter $loss_{weights}=(\alpha, \beta)$ may be used to control the importance between the main and the auxiliary task as follows: $loss_c=\alpha \times l_1 + \beta \times l_2$. During the training, deep learning model 400 aims to minimize the toss, but the individual losses are back-propagated to only those layers that produced the output. With such an approach, the lower level common layers are trained by both tasks, whereas the task specific layers are trained by individual losses.

With continued reference to FIG. 4A, in this example, incident descriptions 402 may be converted to word level vectors using a pre-trained embedding layer 410. As an example, an incident description may include words W1, W2, W3, and WN, which may be converted into vectors for further processing. Pre-trained embedding layer 410 may be implemented as a GloVe embedding layer or a word2vec embedding layer. GloVe relates to a model that captures linear substructure relations in a global corpus of words, revealing regularities in syntax as well as semantics. The GloVe model, trained on five different corpora, covers a vast range of topics and tokens. In this example, in a preferred embodiment, the 100 dimension version of GloVe may be used to create pre-trained embedding layer 410 with the pre-trained GloVe weights.

Vector size may be a 768-dimension vector or a 1024-dimension vector. Additional operations, including position embedding, sentence embedding, and token masking may also be performed as part of pre-trained embedding layer 410. Position embedding may be used to identify token positions within a sequence. Sentence embedding may be used to map sentences to vectors. Token masking may include replacing a certain percentage of the words in each sequence with a mask token. These vectors may improve the performance of the prediction tasks being performed using deep learning model 400. In this example, these vectors may act as characteristic features in named entity recognition being performed using deep learning model 400.

Still referring to FIG. 4A, Bi-directional LSTM network 430 may be implemented as one or more Recurrent Neural Networks (RNNs). An RNN maintains historic information extracted from a sequence or a series like data. This feature may enable an RNN-based model to make predictions at a certain time step, conditional to viewed history. Thus, an RNN may take a sequence of vectors $(x_1, x_2, \ldots, x_n)$ as input and return as sequence of vectors $(h_1, h_2, \ldots, h_3)$ that encodes information at every time step. Although RNNs are capable of encoding and learning dependencies that are spread over long time steps, at times they may fail to do so; this is because RNNs tend to be biased towards more recent updates in a long sequence of situations.

In one example, Long Short-term Memory (LSTM) networks may be used to capture long range dependencies using several gates. These gates may control a portion of the input and pass to the memory cell, and the portion from the previous hidden state to forget. An example LSTM network may comprise a sequence of repeating RNN layers or other types of layers. Each layer of the LSTM network may consume an input at a given time step, e.g., a layer's state from a previous time step, and may produce a new set of outputs or states. In the case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. In this example, Bi-directional LSTM network 430 may include a first LSTM network 440 and a second LSTM network 450. LSTM network 440 may be configured to process a sequence of words from left to right and LSTM network 450 may be configured to process a sequence of words from right to left. LSTM network 440 may include LSTM cell 442, LSTM cell 444, LSTM cell 446, and LSTM cell 448, which may be coupled to receive inputs and to provide outputs, as shown in FIG. 4A. LSTM network 450 may include LSTM cell 452, LSTM cell 454, LSTM cell 456, and LSTM cell 458, which may be coupled to receive inputs and to provide outputs, as shown in FIG. 4A. In addition, as shown in FIG. 4A, both LSTM cell 442 and LSTM cell 452 may provide their output to hidden layer H1 453. Likewise, both LSTM cell 444 and LSTM cell 454 may provide their output to hidden layer H2 455. Similarly, both LSTM cell 446 and LSTM cell 456 may provide their output to hidden layer H3 457. Finally, both LSTM cell 448 and LSTM cell 458 may provide their output to hidden layer HN 459.

An example LSTM layer may be described using a set of equations, such as the ones below:

$f_t = \sigma(W_f \cdot [h_{t-1}, x_t] + b_f)$ $i_t = \sigma(W_f \cdot [h_{t-1}, x_t] + b_i)$ $\tilde{c}_t = \tan h(W_c \cdot [h_{t-1}, x_t] + b_c)$ $c_t = f_t \circ c_{t-1} + i_t \circ \tilde{c}_t$ $o_t = \sigma(W_o \cdot [h_{t-1}, x_t] + b_o)$ $h_t = o_t \circ \tan h(c_t)$ In this example, in the above equations σ is the element wise sigmoid function and ∘ represents Hadamard product (element-wise). In this example, $f_t$, $i_t$, and $o_t$ are forget, input, and output gate vectors respectively, and $c_t$ is the cell state vector. Using the above equations, given a sentence as a sequence of real valued vectors $(x_1, x_2, \ldots, x_n)$, the LTSM (e.g., LTSM network 440 of FIG. 4A) computes $\vec{h}_t$ that represents the leftward context of the word at the current time step t. In this example, a word at the current time step t, receives context from other words that occur on either sides. Thus, a second LSTM (e.g., LSTM network 450 of FIG. 4A) interprets the same sequence in reverse, returning $\overleftarrow{h}_t$ at each time step. In this example, this combination of forward and backward LSTMs corresponds to Bi-directional LSTM network 430. The final representation of the word may be produced by concatenating the left and right context, $h_t = [\vec{h}_t; \overleftarrow{h}_t]$. In this example, inside each LSTM layer, the inputs and hidden states may be processed using a combination of vector operations (e.g., dot-product, inner product, or vector addition) or non-linear operations, if needed.

The instructions corresponding to the machine learning system could be encoded as hardware corresponding to an A/I processor. In this case, some or all of the functionality associated with the learning-based analyzer may be hard-coded or otherwise provided as part of an A/I processor. As an example, A/I processor may be implemented using an FPGA with the requisite functionality.

Any of the learning and inference techniques such as Linear Regression, Support Vector Machine (SVM) set up for regression, Random Forest set up for regression, Gradient-boosting trees set up for regression and neural networks may be used. Linear regression may include modeling the past relationship between independent variables and dependent output variables. Neural networks may include artificial neurons used to create an input layer, one or more hidden layers, and an output layer. Each layer may be encoded as matrices or vectors of weights expressed in the form of coefficients or constants that might have been obtained via off-line training of the neural network. Neural networks may be implemented as Recurrent Neural Networks (RNNs), Long Short Term Memory (LSTM) neural networks, or Gated Recurrent Unit (GRUs). All of the information required by a supervised learning-based model may be translated into vector representations corresponding to any of these techniques.

With reference to FIG. 4B, deep learning model 400 for entity name and data type prediction from the incident descriptions or other sources of incidents' related information may include additional layers, including a time distributed dense layer 460, an attention layer 470, and a conditional random fields (CRF) layer 480. Time distributed dense layer 460 may transpose the Bi-directional LSTM hidden vectors to the shape of the output labels. Attention layer 470 may help the model bias it is learning towards the more relevant sections of the sentences. In addition, CRF layer 480 may produce a valid sequence of output labels. As shown in FIG. 4B, each of these layers may process outputs received from bi-directional LSTM network 430.

Still referring to FIG. 4B, time distributed dense layer 460 may be trained to reshape the vectors received from bi-directional LSTM network 430. In this example, attention layer 470 may be implemented by using the Bidirectional Encoder Representations from Transformers (BERT) model. Attention layer 470 may take as input the hidden states from Bi-directional LSTM network 430, after these inputs have been transposed to output dimensions using time distributed dense layer 460. In this example, attention layer 460 may be implemented at the words level as a neural layer, with a weight parameter $W_\alpha$. In one example, let $h = (h_1, h_2, \ldots, h_T)$ be the input to the attention layer 470, the attention weights and final representation h* of the sentence is formed as follows:

$scores = W_\alpha^T h$ $\alpha = \text{softmax}(scores)$ $$r = h\alpha^T$$

$$h^* = \tan h(r)$$

In the example equations shown above, the softmax and tan h functions are applied element-wise on the input vectors. The values corresponding to h and h* may be concatenated and passed to the next layer. In one example, attention layer 460 may include transformers corresponding to the BERT model. Transformers may convert input sequences into output sequences using self-attention. Transformers may be configured to have either 12 or 24 hidden (h) layers. Transformers may include fully-connected network (FCN) layers, including the EON (Query), EON (Key), and EON (Value) layers.

Figure 5:
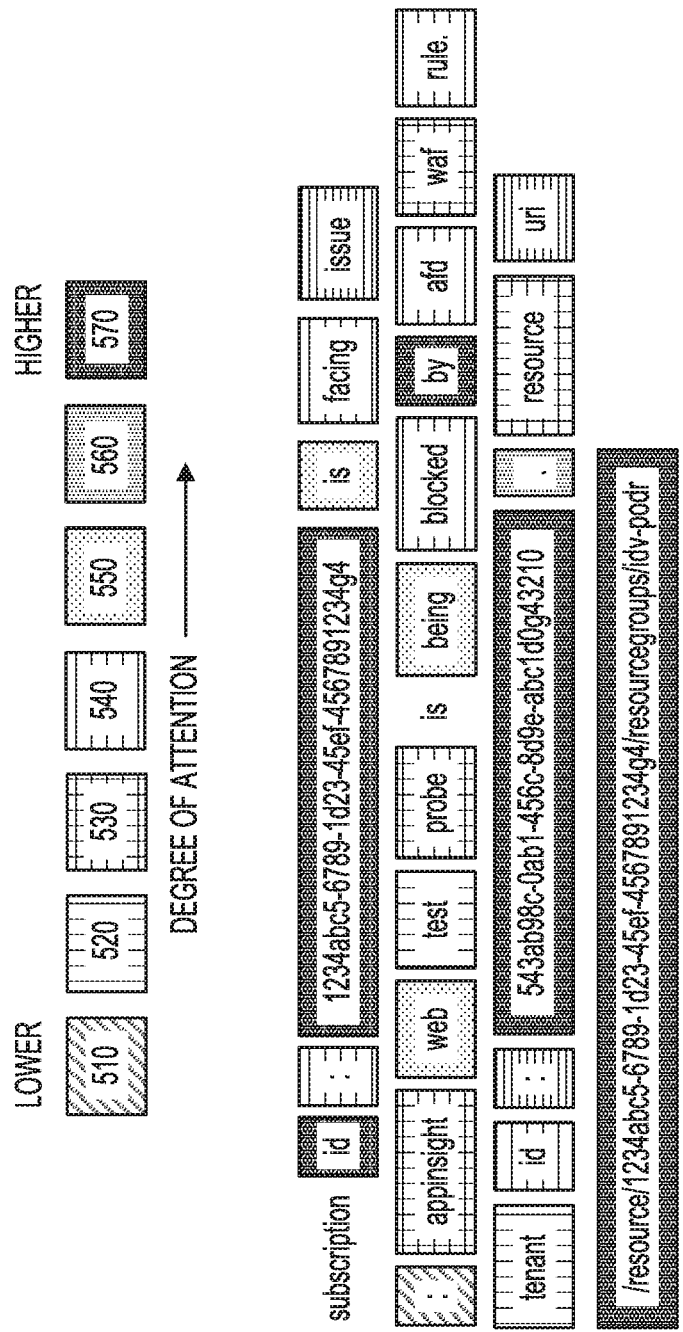
FIG. 5 shows a visual representation of the degree of attention paid to various parts of an incident description in accordance with one example.

Referring now to FIG. 5, a visual representation 500 of the degree of attention paid to various parts of an incident description is shown in accordance with one example. The attention vector a for a test sentence, shown in FIG. 5, illustrates that the attention layer learns to give more emphasis to tokens that have a higher likelihood of being entities. The degree of attention varies from lower to higher. In this example, the different degrees of attention, from a lower degree of attention to a higher degree of attention, are shown as 510, 520, 530, 540, 550, 560, and 570. In case of long sequences, the different degrees of attention to certain sections of the sequence, which are more likely to contain entities, helps improve the sensitivity of deep learning model 400.

Referring back to FIG. 4B, the use of the hidden state representations ($h_t$) as word features to make independent tagging decisions at the word level may still leave the issue of inherent dependencies across the output labels unaddressed. For example, the entity names and corresponding values may have contextual or other types of constraints. Similarly, data types may be constrained in terms of the data types that are usable with certain entity names. In one example, by learning these dependencies and generalizing them to sentences without such constraints, the tagging decisions may be jointly modeled using conditional random fields as part of CRF layer 480.

To explain one example implementation of CRF layer 480, consider an input sequence $X = (x_1, x_2, \ldots, x_3)$ and an output sequence $y = (y_1, y_2, \ldots, y_n)$, where n is the number of words in the sentence. Assuming, for this example, P is the matrix of the probability scores of shape n×k, where k is the number of distinct tags in the output of bi-directional LSTM network 430, including the dense and attention layers. In other words, in this example $P_{i,j}$ is a score that the $i^{th}$ word corresponds to the $j^{th}$ tag. In this example, as part of CRF layer 480, first a score is computed for the output sequence, y, using the example equation below:

$$s(X, y) = \sum_{i=0}^{n} A y_i, y_{i+1} + \sum_{i=0}^{n} P_i, y_i$$

where A represents the matrix of transition scores. Thus, in this example, $A_{i,j}$ is the score for the transition from $tag_i$ to $tag_j$. Then the score is converted to a probability for the sequence y to be the right output using a softmax over Y (all possible output sequences) using the example equation below:

$$p(y \mid X) = \frac{e^{s(X,y)}}{\sum_{y' \in Y} e^{s(X,y)}}$$

In this example, the model corresponding to CRF layer 480 learns by maximizing the log-probability of the correct y. While extracting the tags for the input, the output sequence with the highest score is predicted using the following example equation:

$$y^* = \text{argmax } p(y'|X)$$

$$y' \in Y$$

Thus, in this example implementation of CRF layer 480, CRF layer 480 and attention layer 470 push the model towards learning a valid sequence of tags. As an example, for a sentence that includes the entity name subscription ID and the entity value 12345 (separated by a colon), attention layer 470 may tag the colon as a tenant ID.

In one example, the hyper-parameters for the deep learning models may be set as follows: word embedding size is set to 100, the hidden LSTM layer size is set to 200 cells, and the maximum length of a sequence is limited to 300. These example hyper-parameters may be used with all models. The machine learning models may be trained using any set of computing resources, including using system 300 of FIG. 3. Each computing resource may be implemented using any number of graphics processing units (GPUs), computer processing units (CPUs), memory (e.g., SRAM or other types of memory), or field programmable gate arrays (FPGAs). Application Specific Integrated Circuits (ASICs), Erasable and/or Complex programmable logic devices (PLDs), Programmable Array Logic (PAL) devices, and Generic Array Logic (GAL) devices may also be used to implement the computing resources. In addition, although FIG. 4B describes the use of the BERT model for attention layer 460, any serializable neural network model may be partitioned and used.

Figure 6:
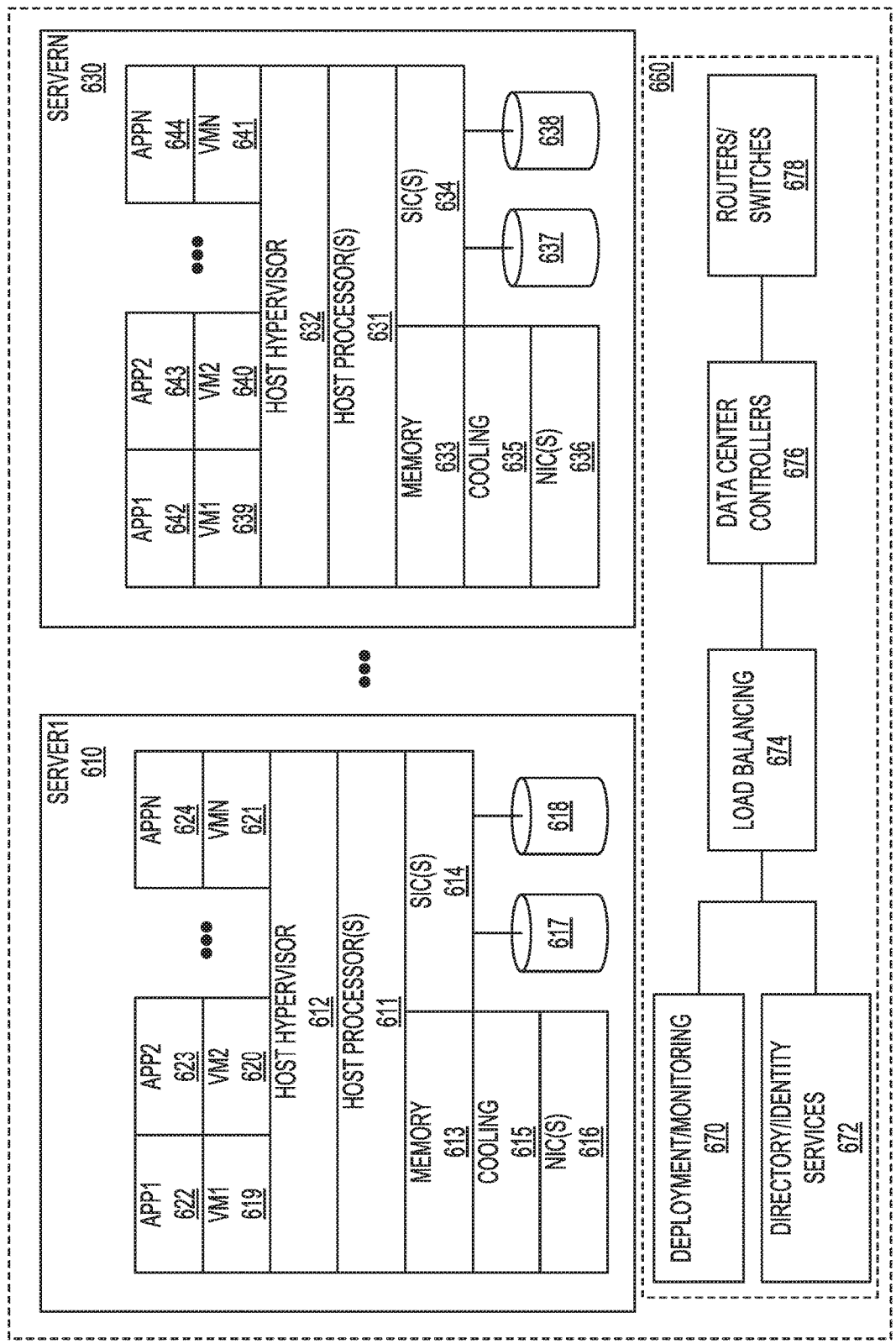
FIG. 6 shows a system environment for implementing a machine learning pipeline of FIG. 2 for automatically extracting entity names and data types related to cloud incidents in accordance with one example.

FIG. 6 shows a system environment for implementing a machine learning pipeline 200 for automatically extracting entity names and data types related to cloud incidents in accordance with one example. In this example, system environment 600 may correspond to a portion of a data center. As an example, the data center may include several clusters of racks including platform hardware, such as server nodes, storage nodes, networking nodes, or other types of nodes. Server nodes may be connected to switches to form a network. The network may enable connections between each possible combination of switches. As used in this disclosure, the term data center may include, but is not limited to, some or all of the data centers owned by a cloud service provider, some or all of the data centers owned and operated by a cloud service provider, some or all of the data centers owned by a cloud service provider that are operated by a customer of the service provider, any other combination of the data centers, a single data center, or even some clusters in a particular data center, System environment 600 may include server1 610 and serverN 630. System environment 600 may further include data center related functionality 660, including deployment/monitoring 670, directory/identity services 672, load balancing 674, data center controllers 676 (e.g., software defined networking (SDN) controllers and other controllers), and routers/switches 678. Server1 610 may include host processor(s) 611, host hypervisor 612, memory 613, storage interface controller(s) (SIC(s)) 614, cooling 615, network interface controller(s) (NIC(s)) 616, and storage disks 617 and 618. ServerN 630 may include host processor(s) 631, host hypervisor 632, memory 633, storage interface controller(s) (SIC(s)) 634, cooling 635, network interface controller(s) (MC(s)) 636, and storage disks 637 and 638.

With continued reference to FIG. 6, server1 610 may be configured to support virtual machines, including VM1 619, VM2 620, and VMN 621. The virtual machines may further be configured to support applications, such as APP1 622, APP2 623, and APPN 624. ServerN 630 may be configured to support virtual machines, including VM1 639, VM2 640, and VMN 641. The virtual machines may further be configured to support applications, such as APP1 642, APP2 643, and APPN 644. Each of server1 610 and serverN 630 may also support various types of services, including file storage, application storage, and block storage for the various tenants of the cloud service provider responsible for managing system environment. In this example, system environment 600 may be enabled for multiple tenants using the Virtual eXtensible Local Area Network (VXLAN) framework. Each virtual machine (VM) may be allowed to communicate with VMs in the same VXLAN segment. Each VXLAN segment may be identified by a VXLAN Network Identifier (VNI).

Deployment/monitoring 670 may interface with a sensor API that may allow sensors to receive and provide information via the sensor API. Software configured to detect or listen to certain conditions or events may communicate via the sensor API any conditions associated with devices that are being monitored by deployment/monitoring 670. Remote sensors or other telemetry devices may be incorporated within the data centers to sense conditions associated with the components installed therein. Remote sensors or other telemetry may also be used to monitor other adverse signals in the data center and feed the information to deployment/monitoring 670. As an example, if fans that are cooling a rack stop working then that may be sensed by the sensors and reported to the deployment/monitoring 670. Although FIG. 6 shows system environment 600 as including a certain number of components arranged and coupled in a certain way, it may include fewer or additional components arranged and coupled differently. In addition, the functionality associated with system environment 600 may be distributed or combined, as needed. Moreover, although FIG. 6 shows VMs, other types of compute entities, such as containers, micro-VMs, microservices, unikernels for serverless functions, may be supported by the host servers in a like manner.

FIG. 7 shows a layout 700 for an incident description in accordance with one example. Layout 700 may correspond to an incident description being displayed, or otherwise being communicated, to a person/team assigned to address the incident at Issue. Layout 700 may include user interface elements to allow interaction. As an example, the following menu options may be associated with layout 700 of the example incident description: Details 702, Diagnostics 704, Notifications 706, Postmortem 708, Activity Log (History) 710, and Similar Incidents 712. When a user selects Details 702 menu option, the information displayed in box 720 may be displayed. The example incident description shown in layout 700 relates to an issue with a virtual machine (VM) in a failed state. Additional details associated with the incident description are shown in box 720. Although example layout 700 shows certain aspects associated with an incident description, other incident descriptions may have a different layout and may include information other than shown in layout 700. Table 4, below, shows entity names and entity values for layout 700.

TABLE 4

{
"cloud": [ "cloudx" ],
"grant permission": [ "true" ],
"instance_id": [ "45ea1234-123b-7969-adaf-e0255045569e" ],
"tenant_id": [ "2aa3abc0-7986-1abc-a98b-443fd7245e6f" ],
"ip_addres": [ "192.168.0.1" ],
"issue": [ "vm in failed state, unable to delete vm or perform any activity" ],
"product_subscription_id": [ "4536dcd6-e2e1-3465-a22b-d25f62456233" ]
"resource_group": [ "tl" ],
"link_with_details":[https://supportcenter.cloudx.com/caseoverview?srid=1123],
}

FIG. 8 shows another layout 800 for an incident description in accordance with one example. Layout 800 may correspond to another incident description being displayed, or otherwise being communicated, to a person/team assigned to address the incident at issue. Layout 800 may also include user interface elements to allow interaction. As an example, similar to layout 700, the following menu options may be associated with layout 800 of the example incident description: Details 802, Diagnostics 804, Notifications 806, Postmortem 808, Activity Log (History) 810, and Similar Incidents 812. When a user selects Details 802 menu option, the information displayed in box 820 may be displayed. The example incident description shown in layout 800 relates to an issue with an error associated with a virtual network (Vnet). Additional details associated with the incident description are shown in box 820. Although example layout 800 shows certain aspects associated with an incident description, other incident descriptions may have a different layout and may include information other than shown in layout 800. Table 5, below, shows entity names and entity values for layout 800.

TABLE 5

{
"ask": [ "please remove the orphaned resources related to this" ],
"problem_type" [ "cannot delete v net" ],
"product_subscription_id": [ "45ea123-123b-7969-adaf-e0255045569e" ],
"v_net_id": [ "4536dcd6-e2e1-3465-a22b-d25f62456123" ],
"v_net_name": [ "wa-vnet" ],
"v_net_region": [ "east56usind" ],
}

Figure 9:
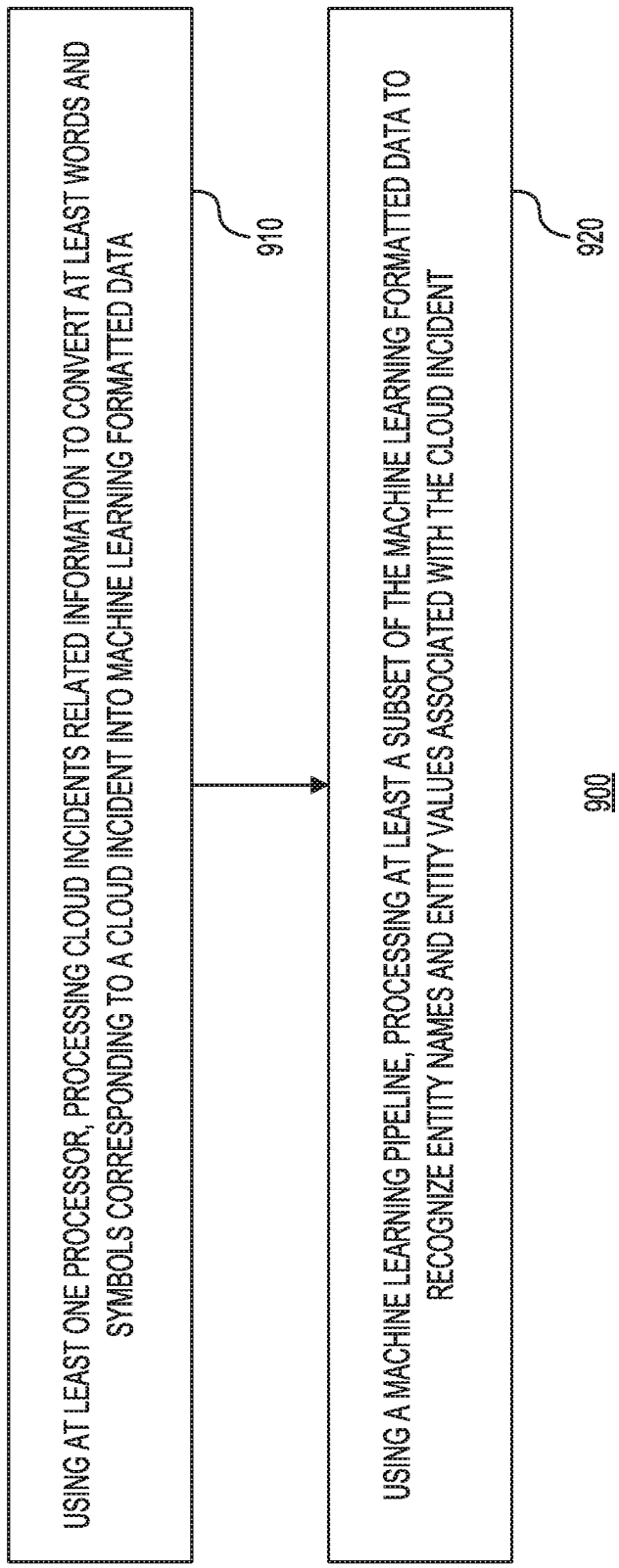
FIG. 9 shows a flow chart of a method for processing cloud incidents related information, including recognizing entity names and entity values in accordance with one example.

FIG. 9 shows a flow chart 900 of a method, implemented by at least one processor, for processing cloud incidents related information, including entity names and entity values associated with incidents having a potential to adversely impact products or services offered by a cloud service provider. Step 910 may include using the at least one processor (e.g., processor(s) 302 of FIG. 3), processing the cloud incidents related information to convert at least words and symbols corresponding to a cloud incident description into machine learning formatted data. As explained earlier, with respect to FIGS. 2-4B, using a pre-trained embedding layer (e.g., pre-trained embedding layer 410) words and symbols corresponding to the cloud incident may be converted into machine learning formatted data. As an example, the words and symbols may be converted into vector data for processing by neural networks.

Step 920 may include using a machine learning pipeline, processing at least a subset of the machine learning formatted data to recognize entity names and entity values associated with the cloud incident. As explained earlier, with respect to FIGS. 2-4B, the machine learning formatted data (e.g., vector data) may be processed to recognize entity names and entity values.

FIG. 10 shows a flow chart 1000 of a method, implemented by at least one processor, for processing cloud incidents related information, including entity names, entity values, and data types associated with incidents having a potential to adversely impact products or services offered by a cloud service provider. Step 1010 may include using the at least one processor (e.g., processor(s) 302 of FIG. 3), processing the cloud incidents related information to convert at least words and symbols corresponding to a cloud incident description into machine learning formatted data. As explained earlier, with respect to FIGS. 2-4B, using a pre-trained embedding layer (e.g., pre-trained embedding layer 410) words and symbols corresponding to the cloud incident may be converted into machine learning formatted data. As an example, the words and symbols may be converted into vector data for processing by neural networks.

Step 1020 may include using a first machine learning pipeline, as part of a first prediction task, processing at least a subset of the machine learning formatted data to recognize entity names and entity values associated with the cloud incident. As explained earlier, with respect to FIGS. 2-4B, at least a subset of the machine learning formatted data (e.g., vector data) may be processed to recognize entity names and entity values.

Step 1030 may include using a second machine learning pipeline, as part of a second prediction task, processing at least a subset of the machine learning formatted data to recognize data types associated with the cloud incident. As explained earlier, with respect to FIGS. 2-4B, the machine learning formatted data (e.g., vector data) may be processed to recognize data types.

In one example, machine learning pipeline 200 and the corresponding deep learning model for entity name recognition and data type recognition may be deployed as part of system environment 600. As an example, machine learning pipeline 200 and the corresponding deep learning model may be deployed as a REST API (e.g., a REST API developed using the Python Flask web app framework). The REST API may offer a POST endpoint which takes the incident description as input and returns the recognized entities in JSON format. The deployment of the REST API in system environment 600 advantageously allows automatically scaling up of the service in response to demand variation. This enables the service to be cost efficient since the majority of the incidents are created during the day. In addition, deployment and monitoring tools in conjunction with machine learning pipeline 200 may enable application monitoring, as part of which service latency or failure issues may be communicated via alerts.

By efficiently recognizing entity names, entity values, and data types, systems and methods described in the present disclosure may enable other applications, as well. As an example, these systems and methods may be used for incident triaging. Advantageously, the recognized entity names and the recognized data types may reduce the feature space because a significant amount of unstructured information in the incident descriptions is not helpful. This may further help in creating incident summaries that are concise and yet informative for a service team. As a result, instead of parsing the verbose incident descriptions, the service team member may quickly analyze the concise summary and act on it, as required, per service agreements and protocols.

In addition, automated health checks may also be performed, alleviating the need for the service team member to review detailed telemetry data and logs. As an example, oversubscription (or undersubscription) of resources may be automatically identified using the automated health checks.

In conclusion, the present disclosure relates to a method, implemented by at least one processor, for processing cloud incidents related information, including entity names and entity values associated with incidents having a potential to adversely impact products or services offered by a cloud service provider. The method may include using the at least one processor, processing the cloud incidents related information to convert at least words and symbols corresponding to a cloud incident into machine learning formatted data. The method may further include using a machine learning pipeline, processing at least a subset of the machine learning formatted data to recognize entity names and entity values associated with the cloud incident.

The method may further include using the machine learning pipeline, jointly processing at least a second subset of the machine learning formatted data with the at least the subset of the machine learning formatted data to recognize data types associated with the cloud incident. The method may further include using a multi-task learning layer, processing both the subset of the machine learning formatted data and the second subset of the machine learning formatted data to generate output data.

The method may further include: (1) using a first time distributed dense layer, reshaping a first subset of the output data, wherein the first subset of the output data corresponds to entity names and entity values, to generate a first set of reshaped data and (2) using a second time distributed dense layer reshaping a second subset of the output data, wherein the second subset of the output data corresponds to data types, to generate a second set of reshaped data. The method may further include: (1) using a first attention layer, processing the first set of reshaped data, emphasizing a first set of tokens more likely to be entity names or entity types and (2) using a second attention layer, processing the second set of reshaped data, emphasizing a second set of tokens more likely to be data types.

The method may further include (1) using learned constraints associated with entity names and entity values, helping recognize the entity names and the entity values associated with the cloud incident, and (2) using learned constraints associated with data types, helping recognize the data types associated with the cloud incident. The method may further include generating a seed database of tagged entity names and tagged entity values by unsupervised tagging of entity names and entity values based on patterns extracted from cloud incidents related information. The method may further include using unsupervised label propagation of the tagged entity names and the tagged entity values, to generate training data for training the machine learning pipeline.

In another example, the present disclosure relates to a system, including at least one processor, for processing cloud incidents related information, including entity names and entity values associated with incidents having a potential to adversely impact products or services offered by a cloud service provider. The system may be configured to using the at least one processor, process the cloud incidents related information to convert at least words and symbols corresponding to a cloud incident into machine learning formatted data. The system may further be configured to using a machine learning pipeline, process at least a subset of the machine learning formatted data to recognize entity names and entity values associated with the cloud incident. The system may further be configured to jointly process at least a second subset of the machine learning formatted data with the at least the subset of the machine learning formatted data to recognize data types associated with the cloud incident. The system may further be configured to using a multi-task learning layer, process both the subset of the machine learning formatted data and the second subset of the machine learning formatted data to generate output data.

The system may further be configured to: (1) using a first time distributed dense layer, reshape a first subset of the output data, wherein the first subset of the output data corresponds to entity names and entity values, to generate a first set of reshaped data and (2) using a second time distributed dense layer reshape a second subset of the output data, wherein the second subset of the output data corresponds to data types, to generate a second set of reshaped data. The system may further be configured to: (1) using a first attention layer, process the first set of reshaped data, emphasizing a first set of tokens more likely to be entity names or entity types and (2) using a second attention layer, process the second set of reshaped data, emphasizing a second set of tokens more likely to be data types. The system may further be configured to: (1) using learned constraints associated with entity names and entity values, help recognize the entity names and the entity values associated with the cloud incident, and (2) using learned constraints associated with data types, help recognize the data types associated with the cloud incident.

In yet another example, the present disclosure relates to a method, implemented by at least one processor, for processing cloud incidents related information, including entity names, entity values, and data types associated with incidents having a potential to adversely impact products or services offered by a cloud service provider. The method may include using the at least one processor, processing the cloud incidents related information to convert at least words and symbols corresponding to a cloud incident into machine learning formatted data. The method may further include using a first machine learning pipeline, as part of a first prediction task, processing at least a subset of the machine learning formatted data to recognize entity names and entity values associated with the cloud incident. The method may further include using a second machine learning pipeline, as part of a second prediction task, processing at least a subset of the machine learning formatted data to recognize data types associated with the cloud incident.

The method may further include using a multi-task learning layer, processing both the first subset of the machine learning formatted data and the second subset of the machine learning formatted data to generate output data. The method may further include: (1) using a first time distributed dense layer, reshaping a first subset of the output data, wherein the first subset of the output data corresponds to entity names and entity values, to generate a first set of reshaped data and (2) using a second time distributed dense layer reshaping a second subset of the output data, wherein the second subset of the output data corresponds to data types, to generate a second set of reshaped data.

The method may further include: (1) using a first attention layer, processing the first set of reshaped data, emphasizing a first set of tokens more likely to be entity names or entity types and (2) using a second attention layer, processing the second set of reshaped data, emphasizing a second set of tokens more likely to be data types. The method may further include: (1) using learned constraints associated with entity names and entity values, helping recognize the entity names and the entity values associated with the cloud incident, and (2) using learned constraints associated with data types, helping recognize the data types associated with the cloud incident. The method may further include: (1) generating a seed database of tagged entity names and tagged entity values by unsupervised tagging of entity names and entity values based on patterns extracted from cloud incidents related information, and (2) using unsupervised label propagation of the tagged entity names and the tagged entity values to generate training data for training the machine learning pipeline.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method, implemented by at least one processor, for processing cloud incidents related information, including entity names and entity values, the method comprising:
   using the at least one processor, processing the cloud incidents related information to convert at least words and symbols corresponding to a cloud incident into machine learning formatted data;
   processing the machine learning formatted data including both: (1) entity names and entity values associated with the cloud incident and (2) any data types for the entity values associated with the cloud incident;
   using a first time distributed dense layer, reshaping the entity names and the entity values, to generate a first set of reshaped data;
   using a second time distributed dense layer, different from the first time distributed layer, reshaping the data types, to generate a second set of reshaped data;
   using a first attention layer, processing the first set of reshaped data emphasizing a first set of tokens more likely to be entity names or entity types;
   using a second attention layer, different from the first attention layer, processing the second set of reshaped data, emphasizing a second set of tokens more likely to be data types;
   using a first conditional random fields (CRF) layer, outputting predicted entity names by processing an output of the first attention layer; and
   using a second CRF, different from the first CRF, outputting predicted data types by processing an output of the second attention layer.

2. The method of claim 1, wherein the processing the cloud incidents related information to convert at least the words and the symbols corresponding to the cloud incident into the machine learning formatted data comprises using an embedding layer.

3. The method of claim 2, wherein a combination of the embedding layer, the first time distributed dense layer, the second time distributed dense layer, the first attention layer, the second attention layer, the first CRF layer, and the second CRF layer comprises a machine learning pipeline.

4. The method of claim 3, further comprising generating a seed database of tagged entity names and tagged entity values by unsupervised tagging of the entity names and the entity values based on patterns extracted from the cloud incidents related information.

5. The method of claim 4, further comprising using unsupervised label propagation of the tagged entity names and the tagged entity values to generate training data for training the machine learning pipeline.

6. The method of claim 3, further comprising generating a seed database of tagged data types by unsupervised tagging of the data types based on patterns extracted from the cloud incidents related information.

7. The method of claim 6, further comprising using unsupervised label propagation of the tagged data types to generate training data for training the machine learning pipeline.

8. A system, including at least one processor, for processing cloud incidents related information, including entity names and entity values associated with incidents having a potential to adversely impact products or services offered by a cloud service provider, the system configured to:
   using the at least one processor, process the cloud incidents related information to convert at least words and symbols corresponding to a cloud incident into machine learning formatted data; and
   process the machine learning formatted data including both: (1) entity names and entity values associated with the cloud incident and (2) any data types for the entity values associated with the cloud incident;
   using a first time distributed dense layer, reshape the entity names and the entity values, to generate a first set of reshaped data;
   using a second time distributed dense layer, different from the first time distributed layer, reshape the data types, to generate a second set of reshaped data;
   using a first attention layer, process the first set of reshaped data, emphasizing a first set of tokens more likely to be entity names or entity types;
   using a second attention layer different from the first attention layer, process the second set of reshaped data, emphasizing a second set of tokens more likely to be data types;
   using a first conditional random fields (CRF) layer, output predicted entity names by processing an output of the first attention layer; and
   using a second CRF, different from the first CRF, output predicted data types by processing an output of the second attention layer.

9. The system of claim 8, wherein the system is further configured to convert at least the words and the symbols corresponding to the cloud incident into the machine learning formatted data using an embedding layer.

10. The system of claim 9, wherein a combination of the embedding layer, the first time distributed dense layer, the second time distributed dense layer, the first attention layer, the second attention layer, the first CRF layer, and the second CRF layer comprises a machine learning pipeline.

11. The system of claim 10, wherein the system is further configured to generate a seed database of tagged entity names and tagged entity values by unsupervised tagging of the entity names and the entity values based on patterns extracted from the cloud incidents related information.

12. The system of claim 11, wherein the system is further configured to, using unsupervised label propagation of the tagged entity names and the tagged entity values, generate training data for training the machine learning pipeline.

13. The system of claim 12, wherein the system is further configured to generate a seed database of tagged data types by unsupervised tagging of the data types based on patterns extracted from the cloud incidents related information.

14. The system of claim 13, wherein the system is further configured to, using unsupervised label propagation of the tagged data types, generate training data for training the machine learning pipeline.

15. A non-transitory media comprising instructions for performing a method, implemented by at least one processor, for processing cloud incidents related information, including entity names and entity values, the method comprising:

using the at least one processor, processing the cloud incidents related information to convert at least words and symbols corresponding to a cloud incident into machine learning formatted data;

processing the machine learning formatted data including both: (1) entity names and entity values associated with the cloud incident and (2) any data types for the entity values associated with the cloud incident;

using a first time distributed dense layer, reshaping the entity names and the entity values, to generate a first set of reshaped data;

using a second time distributed dense layer, different from the first time distributed layer, reshaping the data types, to generate a second set of reshaped data;

using a first attention layer, processing the first set of reshaped data, emphasizing a first set of tokens more likely to be entity names or entity types;

using a second attention layer, different from the first attention layer, processing the second set of reshaped data, emphasizing a second set of tokens more likely to be data types;

using a first conditional random fields (CRF) layer, outputting predicted entity names by processing an output of the first attention layer; and using a second CRF, different from the first CRF, outputting predicted data types by processing an output of the second attention layer.

16. The non-transitory media of claim 15, wherein the processing the cloud incidents related information to convert at least the words and the symbols corresponding to the cloud incident into the machine learning formatted data comprises using an embedding layer.

17. The non-transitory media of claim 16, wherein a combination of the embedding layer, the first time distributed dense layer, the second time distributed dense layer, the first attention layer, the second attention layer, the first CRF layer, and the second CRF layer comprises a machine learning pipeline.

18. The non-transitory media of claim 17, wherein the method further comprising generating a seed database of tagged entity names and tagged entity values by unsupervised tagging of the entity names and the entity values based on patterns extracted from the cloud incidents related information.

19. The non-transitory media of claim 18, wherein the method further comprising using unsupervised label propagation of the tagged entity names and the tagged entity values to generate training data for training the machine learning pipeline.

20. The non-transitory media of claim 19, wherein the method further comprising generating a seed database of tagged data types by unsupervised tagging of the data types based on patterns extracted from the cloud incidents related information, and wherein the method further comprising using unsupervised label propagation of the tagged data types, to generate training data for training the machine learning pipeline.

* * * * *